F. N. WEDGE.
HOISTING AND CONVEYING APPARATUS.
APPLICATION FILED MAR. 11, 1909.
955,832.
Patented Apr. 19, 1910.
2 SHEETS—SHEET 1.
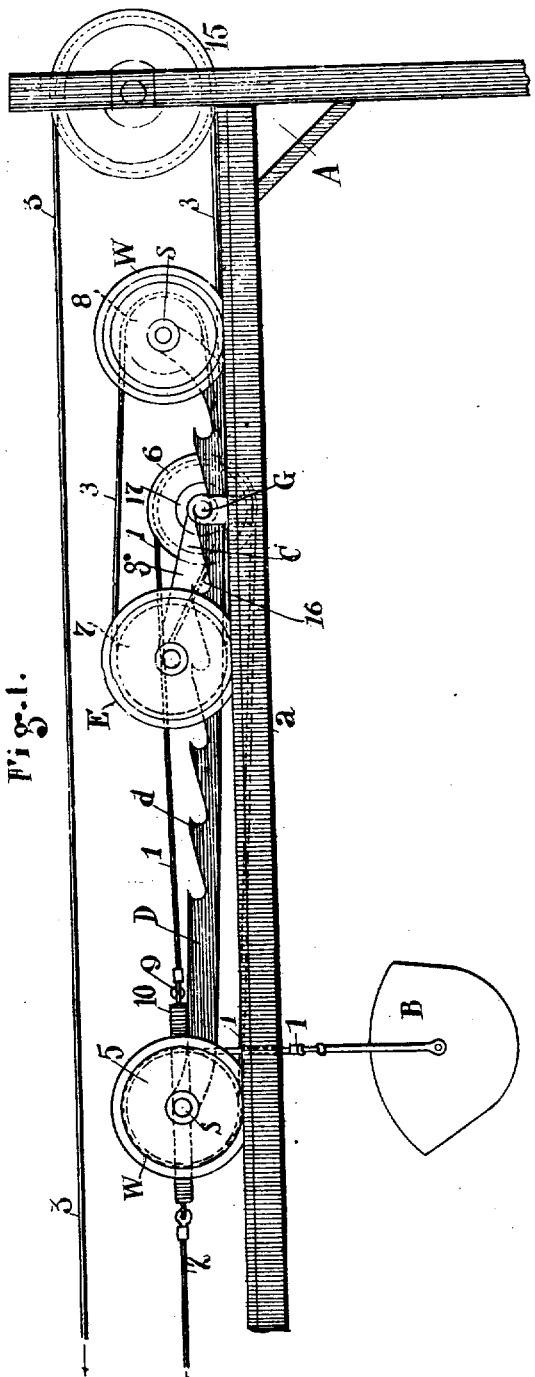
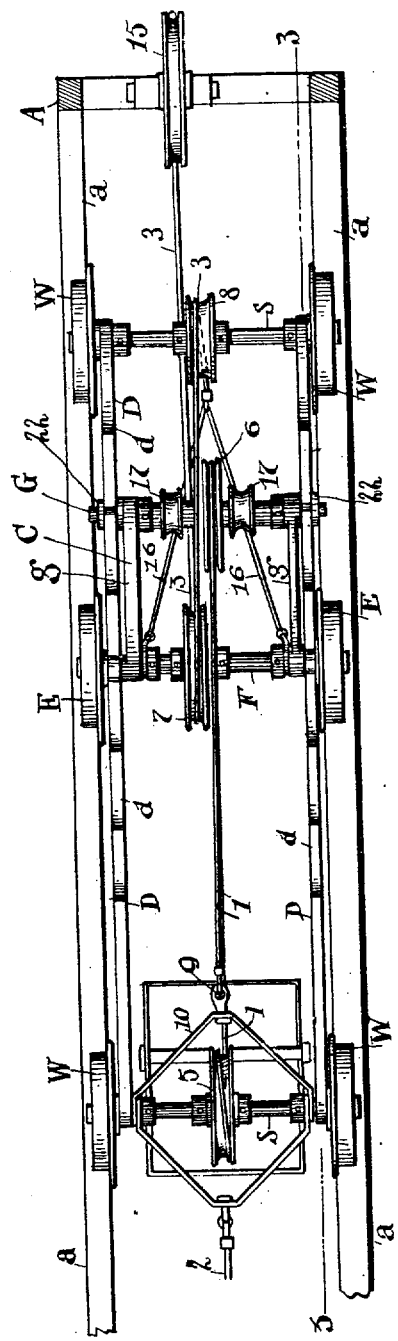
ATTEST
E. M. Fisher
J. C. Museum
INVENTOR.
Frank N. Wedge.
BY Fisher & Moser ATTYS.

F. N. WEDGE.
HOISTING AND CONVEYING APPARATUS.
APPLICATION FILED MAR. 11, 1909.
955,832.
Patented Apr. 19, 1910.
2 SHEETS—SHEET 2.
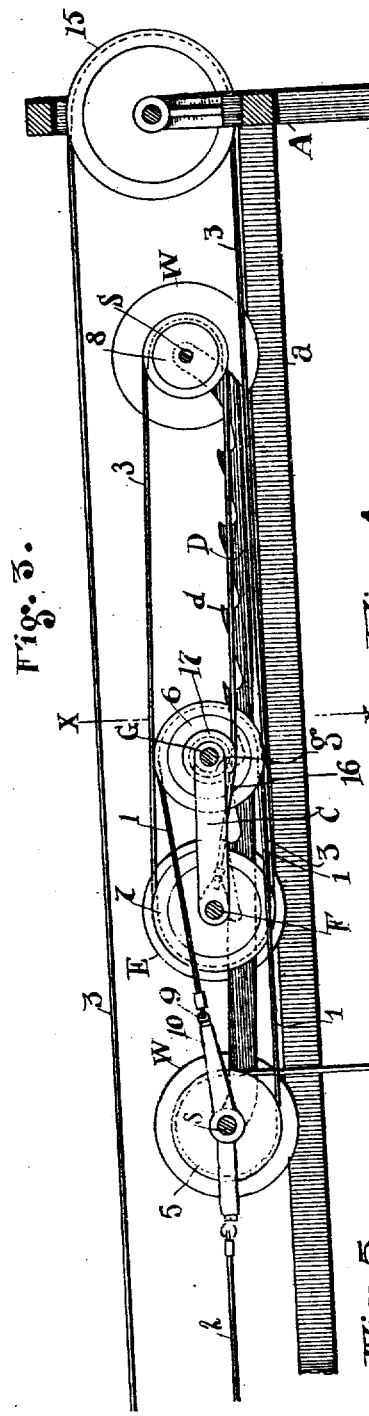
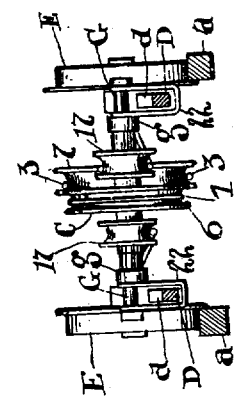
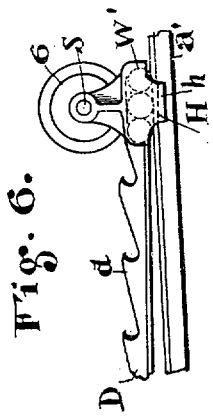
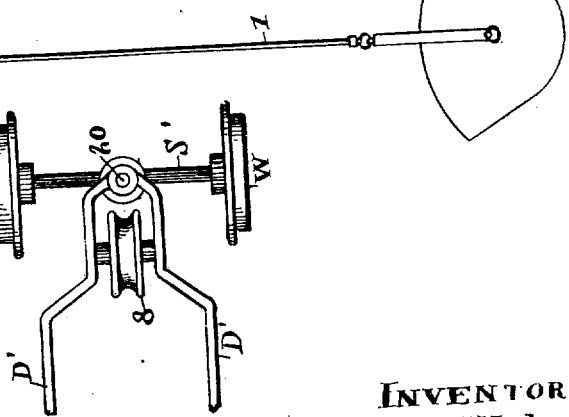
ATTEST:
E. M. Fisher
J. C. Mussun.
INVENTOR
Frank N. Wedge
BY Fisher & Moser ATTYS

UNITED STATES PATENT OFFICE.

FRANK N. WEDGE, OF CLEVELAND, OHIO, ASSIGNOR OF ONE-HALF TO CARRIE WEDGE AND WILLIAM G. WEDGE, OF CLEVELAND, OHIO.

HOISTING AND CONVEYING APPARATUS.

955,832.  Specification of Letters Patent.  Patented Apr. 19, 1910.

Application filed March 11, 1909. Serial No. 482,654.

*To all whom it may concern:*

Be it known that I, FRANK N. WEDGE, citizen of the United States, residing at Cleveland, in the county of Cuyahoga and State of Ohio, have invented certain new and useful Improvements in Hoisting and Conveying Apparatus, of which the following is a specification.

My invention relates to hoisting and conveying apparatus, and the invention consists in an apparatus constructed and adapted to operate substantially as shown and described and particularly pointed out in the claims.

In the accompanying drawings, Figure 1 is a side elevation of the apparatus and part of the elevated track supporting the same, and Fig. 2 is a plan view thereof, the operating parts being locked as shown in these views. Fig. 3 is a sectional elevation corresponding to Fig. 1, but with the operating parts unlocked, as when raising or lowering the hoisting bucket. Fig. 4 is a cross section on line $x$—$x$, Fig. 3, and Fig. 5 is a plan view showing a swivel connection between a modification of the car frame and one of the truck axles. Fig. 6 is a modification showing a series of housed friction rollers in lieu of the flanged car wheels illustrated, for example, in Fig. 4.

The present invention is an improvement upon the apparatus patented to me under date of May 17, 1904, and numbered 760,286, and the nature of the improvements as compared with said patent will appear in the further description herein.

The elevated track or frame work A may be of any suitable kind and elevation and is provided with track rails $a$ for the apparatus to run upon. Said apparatus is shown in Figs. 1 to 4 as comprising a car or truck having wheels W, or their equivalent, Fig. 6, adapted to run on the said rails, shafts S on which said wheels are mounted and side-bars D connecting said shafts and constituting the sides of the car. In this instance the said side-bars D are curved downward somewhat at both ends to bring the straight body portions thereof on a plane lower than shafts S for better operating effects, and said bars are provided with corresponding teeth or projections $d$ along their top edges at suitable intervals apart and alike in both bars, said teeth somewhat resembling ratchet teeth in construction and function as will presently appear. In this connection it is to be noticed that the said side-bars are fixed at both ends upon shafts S and constitute part of permanent portions of the car or car frame, whereas the notched or toothed bars in my patent above referred to are free at one end and there is no such car or truck as is shown herein. Furthermore, the notches or teeth in the patent are along the bottom edges of the bars while in the present apparatus they are along the top edges. Mounted upon said car or truck and also upon the tracks or rails $a$ is the so-called hoisting or lifting device adapted to take up and let out the cable which controls the bucket and referred to hereinafter as the traveler or carrier, and said carrier, indicated as a whole by C, has wheels E adapted to run on rails $a$, a shaft on which said wheels are mounted, a front engaging or locking shaft G and side-bars $g$ connecting said shafts F and G and completing the structure of the carrier as such. Operatively the said carrier rides on rails $a$ by its wheels E, and the ends of shaft G extend across bars D and are adapted to rest upon and engage in the notches or teeth $d$ of said bars. Obviously, also, the said carrier is free to run in either direction in respect to the ends of the car or truck, and for the convenience of this description the end of the car carrying bucket or load B is regarded as the front end, and the opposite end the rear end thereof. From this point of view the ratchet or engaging teeth $d$ of the side-bars extend rearward, and from this it may be observed that when the load is being lowered the carrier is run forward, under the pull of the load as it is released from teeth $d$ and when the load is being raised the carrier is run rearward and shaft G automatically drops into and engages with the teeth $d$ according to its position in the apparatus the instant that tension or pull on hoisting line 3 is relaxed, the weight of the load pulling it down. In other words the said shaft G and the side bars $g$ act as a pawl and the shaft engages the first said teeth after tension is slackened, otherwise and in drawing the carrier toward the rear the cord 6 lifts shaft G out of engagement with teeth $d$.

However, when the load is to be lowered and the carrier travels toward the front the shaft G is raised out of engagement with said teeth by one of the several cables as will presently be seen. Now, as further operating means in connection with the car and load B and carrier C, I employ three several cables 1, 2 and 3, and sheaves 5, 6, 7 and 8 respectively for a single bucket or load apparatus. If more buckets or loads were to be carried the same operating mechanism would be employed and the loads be suspended here or there as might be found practicable and as suggested in my above said patent. For the present, however, it is sufficient to describe the apparatus as shown and with a single lift cable 1 for the bucket or load and which is wound once about sheave 5 mounted on the front car axle and which runs thence back over sheave 6 on shaft G of the carrier and has its other end engaged forward and beneath at 9 to yoke 10 swung from the front axle of the car in this instance. Clearly, with this arrangement of the said cable and its end connections, the load will be lowered as carrier C is run forward, and raised as said carrier is run rearward, because the slack in the cable produced by shortening the loop between sheaves 5 and 6 will be taken up by the bucket as it descends by gravity, whereas the spreading of said sheaves again and lengthening said loop must raise the load.

In the lowering movement of the load shaft G of the carrier is out of engagement with teeth $d$, but in the raising of the bucket the said shaft slides over said teeth and will automatically engage in the nearest set when stopped. A cable 2 is attached to the car or truck from any suitable source of power having a drum or the like, not shown, to draw the car forward, while cable 3, also proceeding presumably from a power controlled drum, not shown, runs over rear sheave 15 on track frame A and thence forward beneath sheave 7 on the front shaft of the carrier and back around the same about sheave 8 on the rear car axle to a fixed stay or connection 16 engaged with shaft F of the carrier in this instance. This arrangement of cable is designed to draw or move the car in the opposite direction to cable 2, and the car is subject to positive and instant control between these cables.

The reach or connection 16 for cable 3 is shown as adapted to exert a lifting or raising action upon two sheaves 17 or their equivalent on shaft G, and being fixed at its ends to or upon shaft F on a higher plane than the bottom of said sheaves it follows that when cable 2 is drawn taut or stretched it will raise shaft G from engagement with teeth $d$ and the carrier will be free to travel toward the front, subject of course to the action of the cables. Now, assuming that the car is held stationary by cable 2 as seen in Fig. 3 with the bucket down and the carrier at the front of the car, a draft or pull on cable 3 will first raise bucket B to traveling position by drawing the carrier to the rear of the car, say as seen in Fig. 1, and then it will draw the car to the rear also as far as it may need to go to unload, or to load as the case may be, cable 2 being surrendered correspondingly. Then by slacking cable 3 somewhat the gravity of the load will assert itself and the load will descend unless for some reason it is desired to hold it suspended. In that case cable 3 can be slacked so as to drop shaft G to engage with teeth $d$ and the drop of the load will be arrested, or, in other words, the load will be supported in suspended position. It will thus be seen that the control of the apparatus is wholly within the three cables 1, 2 and 3, and the sheaves over which they run, with suitable power connections for cables 2 and 3, not shown. Obviously, the apparatus may be stopped anywhere on the line and caused to operate as described for either raising or lowering the bucket, and so also may it be drawn to either end of the line with the bucket full or empty.

In the modification, Fig. 5, I show the side-bars D' as bent inward at their rear ends relatively as shown to obtain a swivel or pivot connection of said frame with the rear shaft S'. Such connection is shown as made with a bolt 20, and sheave 8 is located between said side-bars. This construction is deemed important because it enables me to make curves as well as run on a straight track. In this connection it should be understood, also, that while I show only a rigid track support with rigid rails, I do not limit myself thereto because I may use suitably stretched and supported cables instead, with carrying wheels adapted to run thereon. This is presumed to be an obvious equivalent and alternative of the track work shown and hence within the spirit and terms of my invention as herein set forth.

In Fig. 4 I show a stirrup 22 over each end of shaft G and engaged beneath bars D to confine said shaft within working relations with said bars. Again, in Fig. 6 I show a series of balls W' which substitute the wheels W in other views and are adapted to travel on suitable rails $a'$. Said balls are arranged in a race in housing H, which is rigidly fixed on the end of shaft S, and said housing has a flange $h$ adapted to run along rail $a'$ and serve as a guide for the car. Finally, it may be observed that I can operate the apparatus fairly well by pulling directly upon reach 16 omitting sheaves 7 and 8, but this is done at the expense of power. That is, the said sheaves save or economize power and hence are important.

It will of course be understood from the foregoing description that the load can be suspended at any elevation and trolleyed forward or backward as may be desired.

What I claim is:

1. A hoisting and conveying apparatus having a car with a swivel connection at its rear axle adapting the car to travel about curves, a load lifting carrier mounted on said car and means to operate the car and carrier.

2. In hoisting and conveying apparatus, a mechanism comprising a truck with rigid sides having teeth along their upper edges, and a load raising carrier adapted to travel thereon and to be automatically locked at intervals in said teeth.

3. A truck having rigid sides between its ends with inclined teeth at their top, a load hoisting carrier adapted to travel thereon and a load supporting cable engaged about said carrier in such way as to lift the load by the movements of the carrier on the truck.

4. A truck and a load hoisting carrier adapted to travel thereon, a load carrying cable having a looped engagement about a sheave on said carrier and means to draw the carrier over the truck and lift the load.

5. A truck having rigid sides lowest between their ends and provided with teeth on their top and a traveling carrier thereon and a sheave on each of said parts, and a hoisting cable looped about the sheave on said carrier and running over the sheave on the truck.

6. A truck and a track therefor, a hoisting carrier adapted to run back and forth on said truck and sheaves thereon, a bucket supporting cable looped about one of said sheaves and a carrier drawing cable about the other sheave, and means to hold said truck stationary.

7. In hoisting and conveying apparatus, a suitable truck and a sheave thereon, a cable controlled carrier having a lock shaft adapted to be raised and provided with a sheave, a load supporting cable engaged over both said sheaves and means on said truck to engage said shaft.

8. In hoisting and conveying apparatus, a truck and a cable controlled hoisting carrier adapted to be automatically engaged with the sides thereof at intervals, a load supporting table engaged with said carrier and means to draw the carrier over the truck and raise the load.

9. In hoisting and conveying apparatus, a truck adapted to run upon a track, a cable controlled carrier thereon adapted to lock on the sides of the truck at intervals, sheaves on said truck and carrier and a load supporting cable over said sheaves, and a cable engaged with said carrier and adapted to draw the same against the pull of the load and thereby raise the load.

10. In hoisting and conveying apparatus, a suitable truck, a traveling carrier adapted to run back and forth thereon and to be automatically locked on the track, a hoist cable engaged over said truck with said carrier and cables adapted to draw the truck in in opposite directions, one of said cables being engaged with said carrier.

11. In hoisting and conveying apparatus, a truck and a traveling carrier independently mounted thereon and three several cables connected with said parts comprising one to raise and lower the load and two separate cables to control the position of the truck and of said carrier in respect to the truck.

12. The truck and a load controlling carrier thereon, and cables connected with the carrier and load respectively and adapted to raise the load and to move the carrier on the truck at the same time.

In testimony whereof I affix my signature in presence of two witnesses.

FRANK N. WEDGE.

Witnesses:
E. M. FISHER,
F. C. MUSSUN.

---

It is hereby certified that Letters Patent No. 955,832, granted April 19, 1910, upon the application of Frank N. Wedge, of Cleveland, Ohio, for an improvement in "Hoisting and Conveying Apparatus" were erroneously issued to the inventor, said Frank N. Wedge and Carrie Wedge and William G. Wedge as assignees of one-half interest, whereas the said Letters Patent should have been granted to *Carrie Wedge and William G. Wedge as assignees of one-half interest each*, they being sole owners of said invention; and that the said Letters Patent should be read with this correction therein that the same may conform to the record of the case in the Patent Office.

Signed and sealed this 10th day of May, A. D., 1910.

[SEAL.]

C. C. BILLINGS,
*Acting Commissioner of Patents.* and 8, but this is done at the expense of power. That is, the said sheaves save or economize power and hence are important.

It will of course be understood from the foregoing description that the load can be suspended at any elevation and trolleyed forward or backward as may be desired.

What I claim is:

1. A hoisting and conveying apparatus having a car with a swivel connection at its rear axle adapting the car to travel about curves, a load lifting carrier mounted on said car and means to operate the car and carrier.

2. In hoisting and conveying apparatus, a mechanism comprising a truck with rigid sides having teeth along their upper edges, and a load raising carrier adapted to travel thereon and to be automatically locked at intervals in said teeth.

3. A truck having rigid sides between its ends with inclined teeth at their top, a load hoisting carrier adapted to travel thereon and a load supporting cable engaged about said carrier in such way as to lift the load by the movements of the carrier on the truck.

4. A truck and a load hoisting carrier adapted to travel thereon, a load carrying cable having a looped engagement about a sheave on said carrier and means to draw the carrier over the truck and lift the load.

5. A truck having rigid sides lowest between their ends and provided with teeth on their top and a traveling carrier thereon and a sheave on each of said parts, and a hoisting cable looped about the sheave on said carrier and running over the sheave on the truck.

6. A truck and a track therefor, a hoisting carrier adapted to run back and forth on said truck and sheaves thereon, a bucket supporting cable looped about one of said sheaves and a carrier drawing cable about the other sheave, and means to hold said truck stationary.

7. In hoisting and conveying apparatus, a suitable truck and a sheave thereon, a cable controlled carrier having a lock shaft adapted to be raised and provided with a sheave, a load supporting cable engaged over both said sheaves and means on said truck to engage said shaft.

8. In hoisting and conveying apparatus, a truck and a cable controlled hoisting carrier adapted to be automatically engaged with the sides thereof at intervals, a load supporting table engaged with said carrier and means to draw the carrier over the truck and raise the load.

9. In hoisting and conveying apparatus, a truck adapted to run upon a track, a cable controlled carrier thereon adapted to lock on the sides of the truck at intervals, sheaves on said truck and carrier and a load supporting cable over said sheaves, and a cable engaged with said carrier and adapted to draw the same against the pull of the load and thereby raise the load.

10. In hoisting and conveying apparatus, a suitable truck, a traveling carrier adapted to run back and forth thereon and to be automatically locked on the track, a hoist cable engaged over said truck with said carrier and cables adapted to draw the truck in in opposite directions, one of said cables being engaged with said carrier.

11. In hoisting and conveying apparatus, a truck and a traveling carrier independently mounted thereon and three several cables connected with said parts comprising one to raise and lower the load and two separate cables to control the position of the truck and of said carrier in respect to the truck.

12. The truck and a load controlling carrier thereon, and cables connected with the carrier and load respectively and adapted to raise the load and to move the carrier on the truck at the same time.

In testimony whereof I affix my signature in presence of two witnesses.

FRANK N. WEDGE.

Witnesses:
E. M. FISHER,
F. C. MUSSUN.

---

It is hereby certified that Letters Patent No. 955,832, granted April 19, 1910, upon the application of Frank N. Wedge, of Cleveland, Ohio, for an improvement in "Hoisting and Conveying Apparatus" were erroneously issued to the inventor, said Frank N. Wedge and Carrie Wedge and William G. Wedge as assignees of one-half interest, whereas the said Letters Patent should have been granted to *Carrie Wedge and William G. Wedge as assignees of one-half interest each*, they being sole owners of said invention; and that the said Letters Patent should be read with this correction therein that the same may conform to the record of the case in the Patent Office.

Signed and sealed this 10th day of May, A. D., 1910.

[SEAL.]

C. C. BILLINGS,
*Acting Commissioner of Patents.*

Correction in Letters Patent No. 955,832.

It is hereby certified that Letters Patent No. 955,832, granted April 19, 1910, upon the application of Frank N. Wedge, of Cleveland, Ohio, for an improvement in "Hoisting and Conveying Apparatus" were erroneously issued to the inventor, said Frank N. Wedge and Carrie Wedge and William G. Wedge as assignees of one-half interest, whereas the said Letters Patent should have been granted to *Carrie Wedge and William G. Wedge as assignees of one-half interest each*, they being sole owners of said invention; and that the said Letters Patent should be read with this correction therein that the same may conform to the record of the case in the Patent Office.

Signed and sealed this 10th day of May, A. D., 1910.

[SEAL.]

C. C. BILLINGS,
*Acting Commissioner of Patents.*